(12) United States Patent
Fletcher et al.

(10) Patent No.: US 8,537,311 B2
(45) Date of Patent: Sep. 17, 2013

(54) DISPLAY DEVICES CONTAINING A CIRCULAR POLARIZING SYSTEM AND METHODS RELATED THERETO

(75) Inventors: Bergen Albert Fletcher, Kitchener (CA); Michael Lorne Purdy, Kitchener (CA); Glover Ruiz Prieto, Waterloo (CA); James Alexander Robinson, Elmira (CA)

(73) Assignee: BlackBerry Limited, Waterloo, Ontario ( * ) Notice: Subject to any disclaimer, the term of this patent is extended or adjusted under 35 U.S.C. 154(b) by 334 days.

(21) Appl. No.: 12/938,687

(22) Filed: Nov. 3, 2010

(65) Prior Publication Data

US 2012/0105774 A1 May 3, 2012

(51) Int. Cl.
G02F 1/1335 (2006.01)

(52) U.S. Cl.
USPC .......................................................... 349/98

(58) Field of Classification Search
None
See application file for complete search history.

(56) References Cited

U.S. PATENT DOCUMENTS

| | | | |
|---|---|---|---|
| 5,326,968 A | 7/1994 | Johnson et al. | |
| 5,486,840 A | 1/1996 | Borrego et al. | |
| 6,262,782 B1 | 7/2001 | Yamazaki et al. | |
| 6,403,223 B1 | 6/2002 | Albro et al. | |
| 6,628,369 B2 | 9/2003 | Kumagai et al. | |
| 7,009,751 B2 | 3/2006 | Tonar et al. | |
| 7,561,181 B2 | 7/2009 | Schofield et al. | |
| 2003/0155860 A1 | 8/2003 | Choi et al. | |
| 2004/0069985 A1 | 4/2004 | Cok et al. | |
| 2005/0248698 A1* | 11/2005 | Okamoto et al. | 349/98 |
| 2008/0297685 A1* | 12/2008 | Sugibayashi et al. | 349/58 |
| 2009/0066862 A1 | 3/2009 | Ishii et al. | |
| 2009/0207350 A1* | 8/2009 | Iida | 349/110 |
| 2009/0237602 A1 | 9/2009 | Kubata | |

FOREIGN PATENT DOCUMENTS

| | | |
|---|---|---|
| CA | 2756547 A1 | 5/2012 |
| EP | 2450741 A1 | 5/2012 |
| WO | WO-2004053580 A1 | 6/2004 |

OTHER PUBLICATIONS

"European Application Serial No. 10189878.1, Extended European Search Report mailed Apr. 26, 2011", 6 pgs.
"HNCP Circular Polarizing Filter", Visiontek Systems LTD., HNCP37, HNCP42 Circular Polarizer Filter, HNCP CP Polarizer Display, http://www.visionteksystems.co.uk/polarisercircular.htm, 3 pages.
"Canadian Application Serial No. 266336, Office Action mailed Jan. 14, 2013", 2 pgs.
"European Application Serial No. 10189878.1, Office Action Response filed Jan. 31, 2012", 15 pgs.

* cited by examiner

*Primary Examiner* — Thanh-Nhan P Nguyen
(74) *Attorney, Agent, or Firm* — Schwegman Lundberg & Woessner P.A.

(57) ABSTRACT

Various embodiments include devices and methods that allow a display device to, among other things, substantially match reflected color or luminance, or both, between a lens border and an active area of the display device. In one embodiment, a circular polarizer located external to a display area of the device is used. In one embodiment an additional quarter wave retarder located external to the display area is used.

32 Claims, 5 Drawing Sheets

DISPLAY DEVICES CONTAINING A CIRCULAR POLARIZING SYSTEM AND METHODS RELATED THERETO

BACKGROUND

Mobile devices are becoming increasingly popular and are being used with an expanding number of applications. Consumers are further demanding improved device appearance, even when the mobile device is not in use.

DETAILED DESCRIPTION

In the following description, numerous specific details are set forth in order to provide a thorough understanding of example embodiments. It is to be understood, however, that the various embodiments may be practiced without these specific details. For example, logical, electrical and structural changes may be made without departing from the spirit and scope of the present subject matter. The following detailed description is, therefore, not to be taken in a limiting sense, and the scope of embodiments is defined only by the appended claims.

Display devices containing circular polarizing systems and methods related thereto are described. Embodiments described herein are directed to energy-efficient display devices which have lens-covered displays configured to retain a uniform appearance across an on-state and an off-state. This result may be accomplished by securing a polarizing device to a back or inner side of the lens to reduce reflection between the display and the lens or a reflection off (i.e., from) one or more elements located between the display and the lens, or both, thus allowing an active area defined by a display border on the display (and having an active area color and active area luminance) to substantially match a color or reflected luminance (hereinafter "luminance") i.e., reflected intensity, or both, of a lens border when the active area or the entire device is in the off-state. In one embodiment, the display device is a transmissive display device. In one embodiment, the display device is an emissive display device.

A mobile device can use a variety of display technologies, including, but not limited to, a liquid crystal display (LCD), a light emitting diode (LED), an organic LED (OLED), an active matrix OLED (AMOLED), a cathode ray tube (CRT), a electro luminescent display, a vacuum fluorescent display or a micro electro-mechanical (MEM) display.

When a display on a display device (i.e., the active area of the display) is off, however, a reflection between the display and cover lens or from one or more elements located between the display and the cover lens, or both, is still visible when the active area does not substantially match the reflected intensity and color of the border of the cover lens. It may be desirable, however, to substantially match the active area in the off state with the lens border to create the appearance of a "hidden display."

To date, such attempts to "match" the active area in the off-state include adding paint to a border area of the lens, i.e., the lens border. The paint is chosen on the basis of having a similar color and luminance as the active area when in the off-state. However, since it is not possible to substantially match these features of the active area using only paint, the results have been disappointing. For example, oftentimes, a "painted" display device (i.e., a display device having a painted lens border), has a lens border which appears different in color (e.g., darker), has a different luminance, or both as compared to the color, luminance, or both, of the active area, when in the off-state.

In one embodiment, one or more circular polarizers are added to the display device to address this problem. Essentially, a circular polarizer (i.e., circular polarizing filter) modifies ambient light as it passes through, trapping the minor image on reflection from a reflecting surface. In embodiments in which the display device emits a linearly polarized light or signal, this signal is allowed to pass through the circular polarizer, appearing to the user as a bright image against a dark background. In one embodiment, the circular polarizer is added to a bottom surface of a lens located on the outermost surface of the display device. In one embodiment, signal throughput efficiency is improved with use of a quarter wave retarder located on a top surface of the display to convert the linear polarized light. In one embodiment, the quarter wave retarder and linear polarizer are aligned with the circular polarizer on the lens to maximize signal throughput efficiency.

Figure 1:
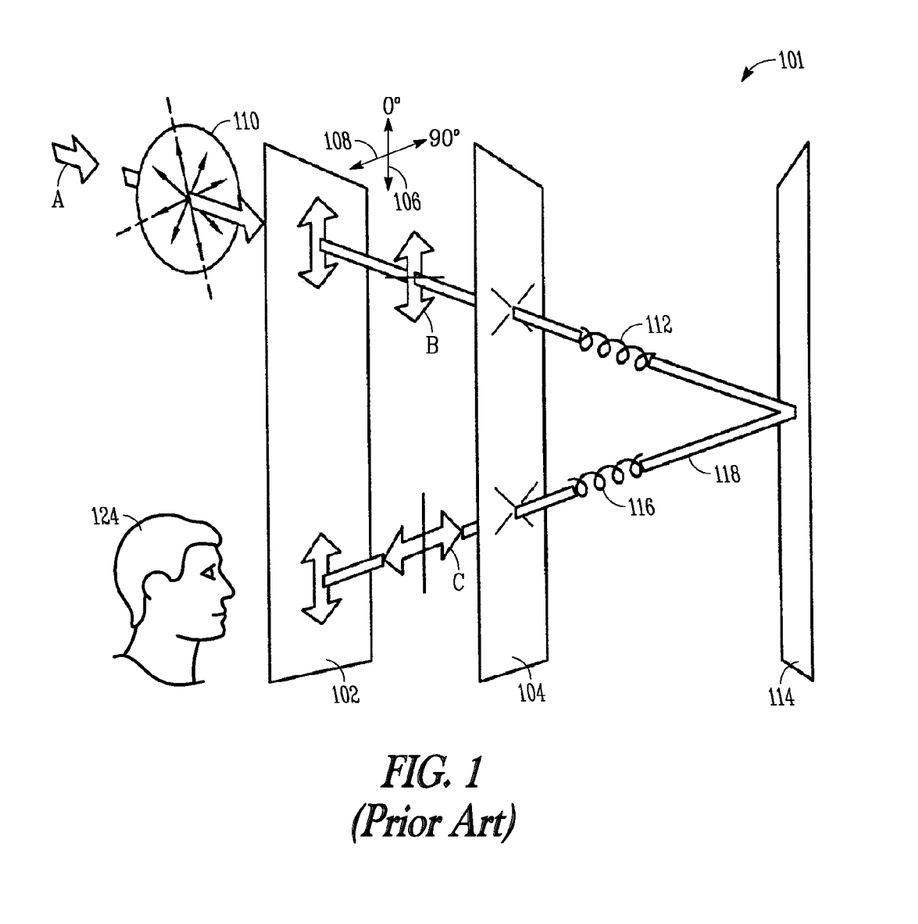
FIG. 1 is an illustration of the operation of a circular polarizer.

FIG. 1 illustrates the operation of a conventional circular polarizer 101 which comprises a linear polarizer 102 and a quarter wave retarder 104. The linear polarizer 102, in turn, is known to have a transmitting axis 106 and an absorbing axis 108. As described in U.S. Pat. No. 5,326,968 to Johnson, et al, in a circular polarizer, unpolarized light 110, such as ambient light, passes in a direction symbolically represented by arrow "A" through the linear polarizer 102 and quarter wave retarder 104. As the unpolarized light 110 passes through the linear polarizer 102, it becomes polarized, with only the light which is aligned with the transmitting axis 106 permitted to pass through. This polarized linear light is symbolically represented by arrow "B" which is aligned in a predefined plane parallel to the transmitting axis 106, i.e., the light is polarized in the direction represented by arrow "B." Thereafter, the light passes through the quarter wave retarder 104, to result in polarized directional circular light, such as polarized right circular light 112. The quarter wave retarder has a fast and slow axis, which are perpendicular to one another. To generate circularly polarizer light, the transmitting axis 106 of the linear polarizer is aligned at 45 degrees to the fast and slow axes of the quarter wave retarder.

If the polarized right circular light 112 (i.e., "incident light") strikes an object, such as a reflecting surface 114, which does not result in a scattering of the polarized right circular light 112, the light will switch handedness, which, in the example shown in FIG. 1, causes the light to return as polarized left circular light 116 (i.e., "reflected light") along a line 118. The polarized left circular light 116 passes again through the quarter wave retarder 104, resulting in polarized linear light having a direction represented by arrow "C." Since this light is along the absorbing axis 108 of the linear polarizer 102, it cannot pass through the linear polarizer 102, and thus cannot be seen by a user 124.

Figure 2:
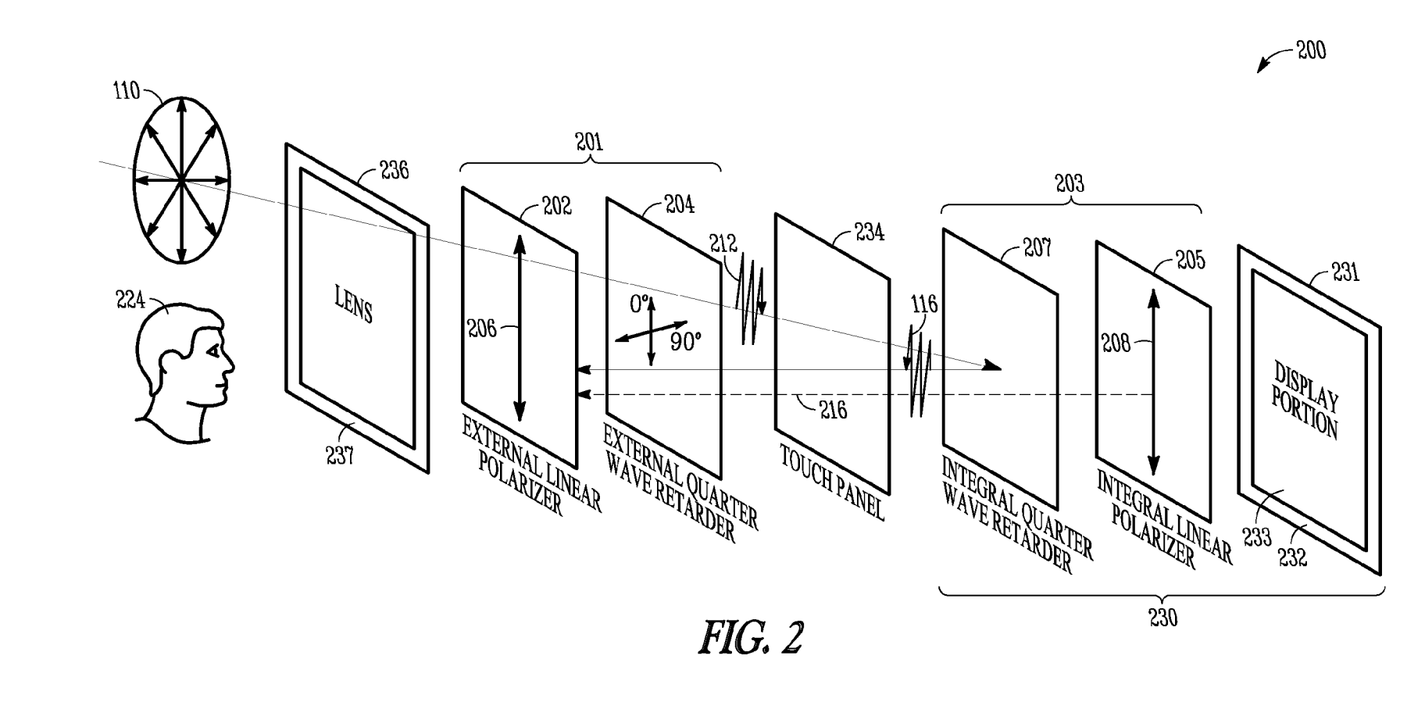
FIG. 2 is an illustration of a polarizing system in a display device according to an example embodiment.

FIG. 2 illustrates a novel display device 200 comprising a display 230 having a display portion 231 with a display border 232 located along its perimeter to define an active area 233 therein. The display border 232 can comprise any suitable dimensions. In one embodiment, the display border 232 comprises no more than about five (5) to 10% of the total surface area of the display portion 231, such as about two (2) to five (5) mm in width for a display portion 231 having a surface area of about 20 to 40 mm². The active area 233 comprises an area in which data can be viewed by a user 224 in the form of text, icons, images, video, and the like, when the display device 200 is on, but can appear as a blank or substantially dark or uniform image when the display portion 231 or the entire display device 200 is off. The active area 233 can have an active area color and an active area luminance. In one embodiment, the display device 200 further has one or more elements located between the display 230 and a cover or lens 236, such as a touch panel 234, as shown in FIG. 2, which can substantially cover the active area 233.

Figure 4:
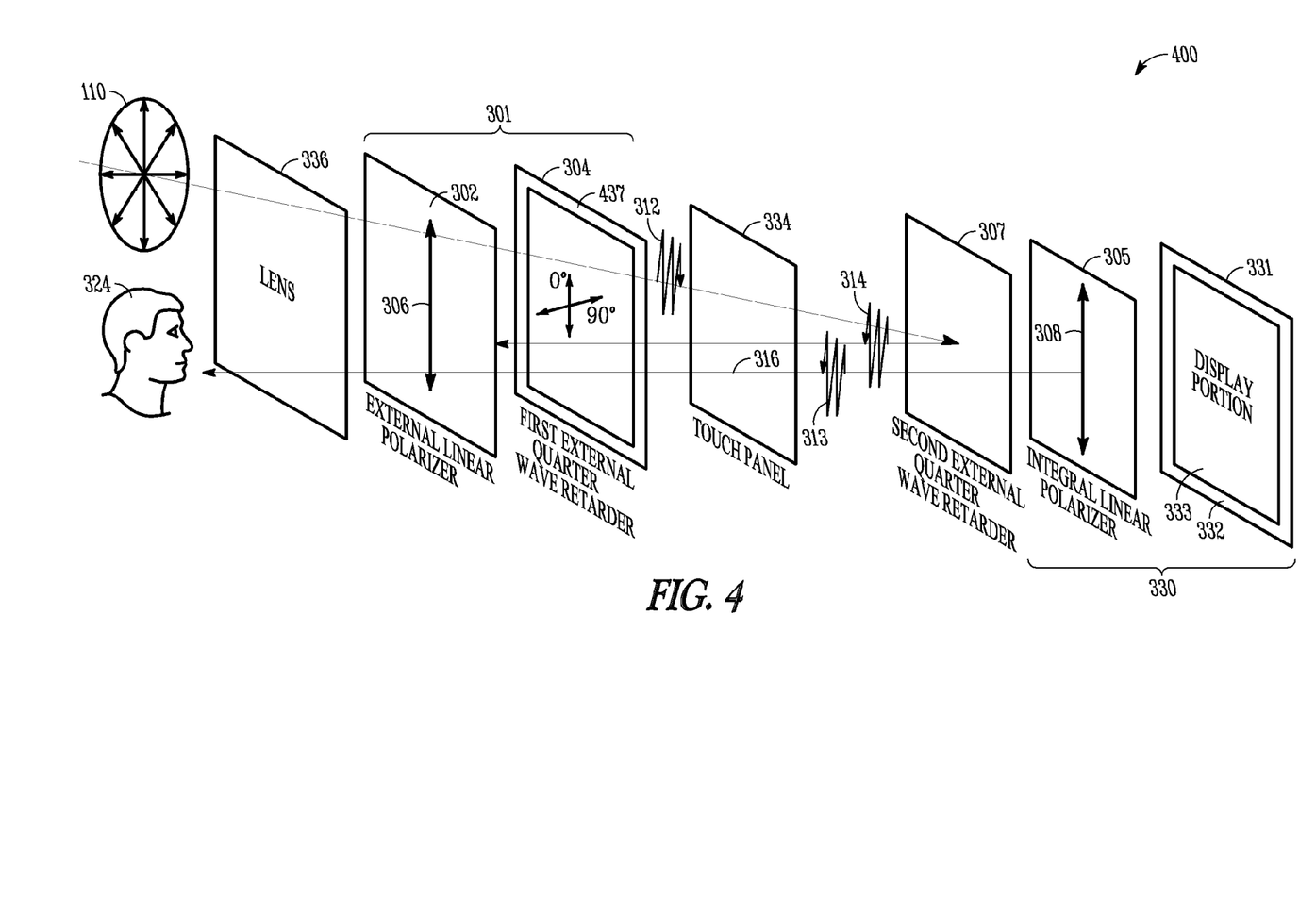
FIG. 4 is an illustration of another alternative polarizing system in a display device according to an example embodiment.

The lens 236 can have an outer surface, an inner surface, and a lens border 237 with a lens border color. In other embodiments, the lens border is not located on the lens 236 (i.e., is not in front of the circular polarizer), but is located on the circular polarizer (i.e., behind the circular polarizer). See, for example, FIG. 4.

In one embodiment the lens 236 is substantially aligned with and located external to display 230, thus providing a cover for the display device 200. In the embodiment shown in FIG. 2, a polarizer, such as a circular polarizer, is located external to the display 230 (hereinafter "external circular polarizer 201") and proximate to an inner surface of the lens 236. The external circular polarizer 201 can be integral with the inner surface of the lens 236 or added as a separate component, such as a film. In one embodiment, the external circular polarizer 201 is added to a front side of the touch panel 234, although such a configuration further removes the external circular polarizer 201 from an outer surface of the lens 236. The external circular polarizer 201 can also be located on the outer surface of the lens 236, although such a configuration may be less durable. The external circular polarizer 201 reduces reflection between the display 230 and the lens 236 or from one or more elements located between the display 230 and the lens 236, such as the touch panel 234, or both, thus allowing the active area 233 of the display 230 to substantially match the color, and in some embodiments, the luminance, of the lens border 237 when the display device 200 is off, while minimizing any adverse affect to the appearance of the active area 233 (i.e., display on-state optics) while the display device 200 is on. In this way, a more uniform appearance is provided on the display device 200 when in an off state, as compared with a conventional display device having no external circular polarizer.

In one embodiment, there is no touch panel 234. In one embodiment, the one or more elements are selected from a touch panel 234, an air gap, adhesive/glue (optically clear), a transparent conductor such as indium tin oxide (ITO), lamination material, one or more metal jumpers, or any combination thereof.

In use, unpolarized ambient light 110 enters the display device 200 through the lens 236 and upon reaching the back surface of the lens 236, simultaneously or subsequently passes through the external circular polarizer 201, first passing through an external linear polarizer 202 and an external quarter wave retarder 204. The external linear polarizer 202 polarizes the light 110, allowing only the portion of the light aligned with its transmitting axis, i.e., external linear polarizer transmitting axis 206, to pass through, as shown in FIG. 1.

Thereafter, the light passes through the external quarter wave retarder 204 which converts the linearly polarized light into right or left hand circularly polarized determined by the orientation of a "fast axis" (i.e., "long axis" of the wavefront ellipsoid, as understood in the art) of the external quarter wave retarder 204 to the external transmitting axis 206 of the external linear polarizer 202. For exemplary purposes only, in the embodiment in FIG. 2, the light exiting the external quarter wave retarder 204 is polarized left circular light 212.

In the embodiment shown in FIG. 2, the polarized left circular light 212 then passes through the touch panel 234 and reaches the display 230. In this embodiment, the display 230, which includes the display portion 231 and an internal polarizer 203, comprises an integral linear polarizer 205 and an integral quarter wave retarder 207. In one embodiment, the integral quarter wave retarder 207 emits circularly polarized light. In one embodiment, the integral quarter wave retarder 207 emits elliptically polarized light.

A portion of the light can reflect off a front surface of the display portion 231 or a front surface of the one or more elements, such as the touch panel 234, or both, and travel or pass back (outwardly towards the user 224) through the integral linear polarizer 205. In one embodiment, however, most of the light, is reflected off a top surface of the integral quarter wave retarder 207 due to, for example, an air gap (not shown), such as between the touch panel 234 and the integral quarter wave retarder 207. The integral quarter wave retarder 207 causes light reflecting off its top surface, i.e., reflected light 212, to switch handedness. As a result, the reflected light 212 cannot pass through the external quarter wave retarder 204. Therefore, this reflected light 212 also does not transmit through the external linear polarizer 201 to the user 224. Light exiting the integral linear polarizer 205 is aligned with a display transmitting axis 208, which itself is aligned with the external linear polarizer transmitting axis 206 as shown by line 216, in order to reduce or minimize transmittance loss. In one embodiment, this loss is no more than about 15%.

In the embodiment shown in FIG. 2, the external circular polarizer 201 does not cover the entire lens 236, i.e., inner or back surface of the lens 236. Instead, the external circular polarizer 201 covers a portion of the inner surface of the lens 236 within the lens border 237, which defines an outer area of the lens, which is an area of substantially the same size as the active area 233 of the display portion 231. As a result, a line between the lens border 237 and the active area 233 may still be discernable when the display device 200 is in an off state, e.g., the active area 233 may appear to be grayer in color than the lens border 237 when the device is in an off state.

In order to minimize this appearance, the lens border 237 can be any suitable color adapted to substantially match the appearance of the active area 233 when in the off state. In one embodiment, the active area 233 substantially matches the color of the lens border 237. In one embodiment, the active area 233 also matches the luminance of the lens border 237. In one embodiment, the lens border 237, and, optionally, the display border 232, are provided with a dark color, such as a substantially black, gray, or black-gray color. This dark color can be provided via any suitable means known in the art, including, but not limited to, silk-screening, inking or painting. In one embodiment, the dark color is providing on both sides of the lens border 237.

Figure 3:
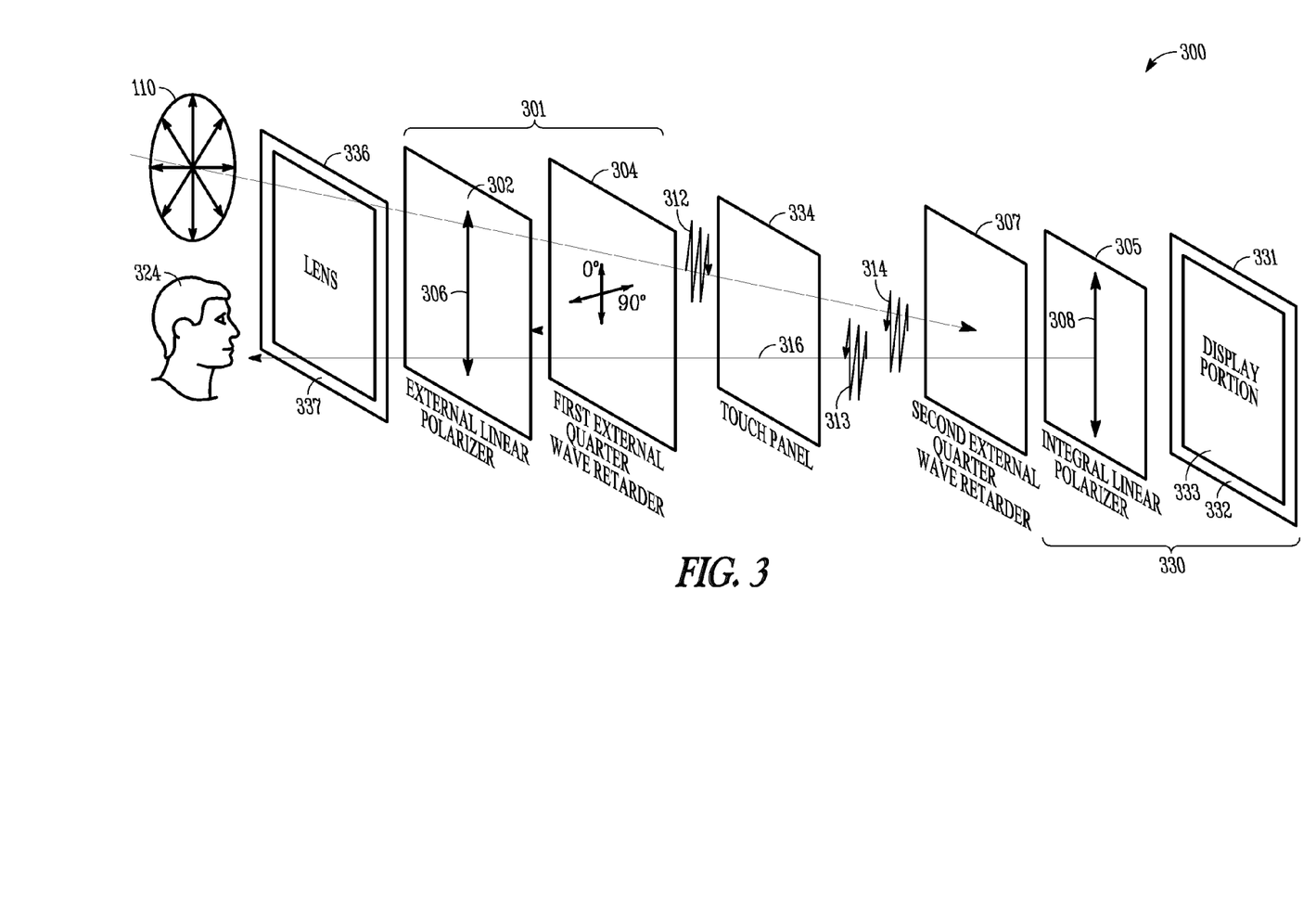
FIG. 3 is an illustration of an alternative polarizing system in a display device according to an example embodiment.

In an alternative embodiment, as shown in FIG. 3, the novel display device 300 comprises a display 330 (which emits linear light) with a display border 332 located along its perimeter to define an active area 333 therein. In this embodiment, a polarizer, such as an external circular polarizer 301 (which can be integral with the inner surface of the lens 236 or added as a separate component, such as a film), covers the entire inner surface of a lens 336. In this way, the color and luminance match between the lens border and the active area, when the device is in the off-state, is improved.

As noted above, the external circular polarizer 301 can also be added to a front surface of the touch panel 334. The lens 336 can be substantially aligned with and located external to the display 230, thus providing a cover for the display device 300. In this way, not only can a lens border 337 on the lens 336 substantially match the color, and in some embodiments, the luminance, of an active area 333 defined by the display border 332, since there is no discernable line between the active area 333 and the lens border 337, a substantially seamless appearance can now be provided to a user 324 across the active area 333 and the lens border 337, when the display device 300 is in an off state. Such a configuration further reduces or minimizes the impact of transmitted light being emitted from a display device 300 and has minimal, if any, adverse affect to display on-state optics. As with the lens border 237 described above, the lens border 337 can comprise a silk-screened border or an inked border or a painted border, such as a substantially black-colored border located on one or both sides of the lens border 237.

In the embodiment shown in FIG. 3, the display device 300 further has one or more elements located between the display 330 and a cover or lens 336, such as a touch panel 334, which can substantially cover the active area 333. The display border 332 can comprise any suitable dimensions and encompass any suitable percentage of the total surface area of the display portion 331 as described above for FIG. 2, and the active area 333 has the same features as described above.

In contrast to the embodiment shown in FIG. 2, however, in this embodiment, the display portion 330 can emit linear polarized light from an integral linear polarizer 305 through an integral transmitting axis 308. Therefore, in the embodiment shown in FIG. 3, the display device 300 further comprises a second quarter wave retarder 307 to ensure most (e.g., at least about 85%) of the light leaving the display 330 is circularly polarized. In this way, any light passing through the lens 336 appears to the user 324 as a bright image against a dark background. As a result, and as noted above, the active area 333 and lens border 337 can appear substantially identical in color or luminance or both, thus creating a desirable seamless appearance on the display 330, which can be most noticeable when the display device 300 is in an off state.

In one embodiment, the lens border (e.g., lens border paint) is located on a bottom (i.e., back) side of the circular polarizer. See, for example, FIG. 4, which shows a lens border 437 located on the back side of the first external quarter wave retarder 304.

In use, unpolarized ambient light 110 enters the display device 300 through the lens 336 and upon reaching the back surface of the lens 236, simultaneously or subsequently passing through the external circular polarizer 301, passing first through the external linear polarizer 302 and then the first external quarter wave retarder 304. The external linear polarizer 302 polarizes the light 110, allowing only the portion of the light aligned with its transmitting axis, i.e., external linear polarizer transmitting axis 306, to pass through, as shown in FIG. 3.

Thereafter, the light passes through the first external quarter wave retarder 304, where it is rotated by 45 degrees to result in polarized left or right circular light, as shown and described in FIG. 2. For exemplary purposes only, in the embodiment shown in FIG. 3, the light exiting the first external quarter wave retarder 304 is polarized left circular light 312. The polarized left circular light 312 then passes through the touch panel 334 and, upon being reflected from a front surface of the display 330 or a front surface of one or more elements located between the display 330 and the second external quarter wave retarder 307, or both, passes through the second external quarter wave retarder 307 where it is rotated in the opposite direction to produce, in this embodiment, polarized right circular light 313 which cannot travel or pass back (outwardly towards the user 324) through the external linear polarizer 302. In this embodiment, the display 330 includes only the display portion 331 and the integral linear polarizer 305. As such, the display 330 contains no integral quarter wave retarder (such as the integral quarter wave retarder 207 shown in FIG. 2).

Polarized linear light 316 emitted by the display 330 is also polarized in the second external quarter wave retarder 307 to ensure light leaving the display 330 (in the direction of the user 324) is circularly polarized. For exemplary purposes only, in the embodiment shown in FIG. 3, the light exiting the second external quarter wave retarder 307 is polarized left circular light 314, which is transmitted through the lens 336, as shown in FIG. 3. In one embodiment, the external transmitting axis 306 and the display transmitting axis 308 are substantially aligned for maximum light transmission. In one embodiment, more than 85% of the light is transmitted through the lens 336.

In one embodiment, a display device comprises a lens device, wherein the lens device comprises a lens border defining an outer area of a lens, the lens border having a lens border color; and a circular polarizer located proximate to the lens border, wherein the lens border color substantially matches an active area color of an active area located on the display device is provided. In this embodiment, the lens device is formed from the circular polarizer. In one embodiment, the display device further comprises a lens located external to the display. In one embodiment the lens border is located between the lens element and the circular polarizer. In one embodiment the lens border is located underneath the circular polarizer.

The circular polarizer (201, 301) can be made from any suitable material, such as glass or acrylics, as well as plastic film. The circular polarizer (201, 301) can further be a laminate or film made from any of these or other suitable materials.

The circular polarizer (201, 301) can be of any suitable thickness and further have any suitable shape, such as a shape which conforms with the shape of the device to which it is secured or applied. In one embodiment, the circular polarizer (201, 301) is at least about 0.1 mm thick. In one embodiment, the circular polarizer (201, 301) is between about 0.1 mm and about 0.3 mm in thickness, including any range there between, or between about 0.1 mm and about 0.15 mm, including any range there between.

The lens (236, 336) or the circular polarizer (201, 301), or both, can each optionally further have a non-glare surface finish or an anti-reflective surface finish, which can be useful when the device is being used in sunlight. In one embodiment, the circular polarizer (201, 301) is neutral in color. In one embodiment, the quarter wave retarder (i.e., retarder element, such as 204, 207, 304) provides a substantially constant retardation across the visible spectrum (optimized for $\lambda/4$ at 555 nm, but maintained as close to $\lambda/4$ as possible from 390 nm to 750 nm).

The circular polarizer (201, 301) can be made by any standard methods known in the art, such as a dry film lamination process. The circular polarizer (201, 301) can have any suitable polarizing efficiency and single unit transmission. In one embodiment, the polarizing efficiency or the single unit transmission, or both, is maximized. In one embodiment, the circular polarizer (201, 301) has a polarizing efficiency ≧99% and a single unit transmission greater than about 43%. The circular polarizer (201, 301) can further have any suitable durability, i.e., temperature and humidity tolerances, depending on the particular application. In one embodiment, the circular polarizer (201, 301) can withstand high temperatures, such as up to about 27° C. (about 80.6° F.) or higher, such as up to 43° C. (109.4° F.), and high humidity conditions, such as up to 95% or greater, including up to 100% humidity.

In one embodiment, the distance between the circular polarizer 110 and the outer surface of the lens (236, 336), i.e., the thickness of the lens, is no greater than about 0.5 mm. In one embodiment, the thickness is between about 0.2 up to less than one (1) mm, although, in some embodiments, the thickness of the lens (236, 336), may be as high as 1.5 mm, including any ranges there between.

In one embodiment, the thickness from a top surface of the display portion (231, 331), plus the thickness of any lamination material (such as optically clear adhesive (OCA), plus the thickness of a touch panel (if present), together with the thickness of an air gap (e.g., located between the touch panel and the display) plus the thickness of an outer cover, such as a lens (e.g., ~0.5 mm) (236, 336) can be within a range of about one (1) to about 1.5 mm thick.

In contrast to conventional prior art devices having a circular polarizer located within, or used as a top layer of, a display, such that the circular polarizer is at least about one (1) mm away from the outer surface of the lens, the novel devices described herein minimize this distance by locating the circular polarizer (201, 301) immediately adjacent to, or integral with, an inner surface of the outer covering (e.g., lens 236, 336). Therefore, any reflections between the display portion (231, 331) and the lens (236, 336), or from any of the one or more elements located between the display portion (231, 331) and the lens (236, 336) is minimized. Additionally, although such conventional devices may reduce reflection between metal layers present in a display (e.g., in an active matrix organic light emitting diode), they do not solve the problems being addressed herein, which includes reducing the reflections between the display and cover lens, from any of the one or more elements located between the display and cover lens, or both.

The novel display devices described herein can be combined with any product having a lens with or without a touch panel. The display device, in some embodiments, can be a portion, part, or component of a broader system or assembly, including a camera device or any type of mobile wireless device, including, but not limited to, mobile telephones, portable computers, personal digital assistants (PDAs), "smart" phones, global positioning system (GPS) device and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. A personal computer (PC) herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers (PCs). An example of a portable PC is a laptop computer or notebook computer that typically has a display screen, keyboard, underlying hardware and software, and a display pointing device that are all integrated in a housing that can easily be carried by an individual. Some PDAs may be viewed as a type of portable computer.

The display device is capable of receiving image information to be displayed, such as a mobile code image. The mobile code image can be received in several ways, such as from a camera or via a web page, email, a picture-based message, or other electronic modes depending on the capabilities of the mobile electronic device. The mobile code image is received by an application executing on the mobile electronic device and resolved to obtain the dataset. The data from the dataset is then parsed or otherwise processed by the application to obtain the content and additional content identifier. The content item can then be presented along with a representation of the additional content item identifier. The representation of the additional content item identifier can be content-retrieved from a network location, such as a location in the database via a server identified by the additional content item identifier, a user interface control that can be selected by a user to trigger downloading of the additional content based on the additional content item identifier, or other representation. Although the dataset may include renderable content, such as an image, text, graphic, audio, or other content, embodiments described herein are generally pertinent to renderable visible content (e.g., image, text, graphic, and the like). The dataset can also include an identifier of additional content.

Figure 5:
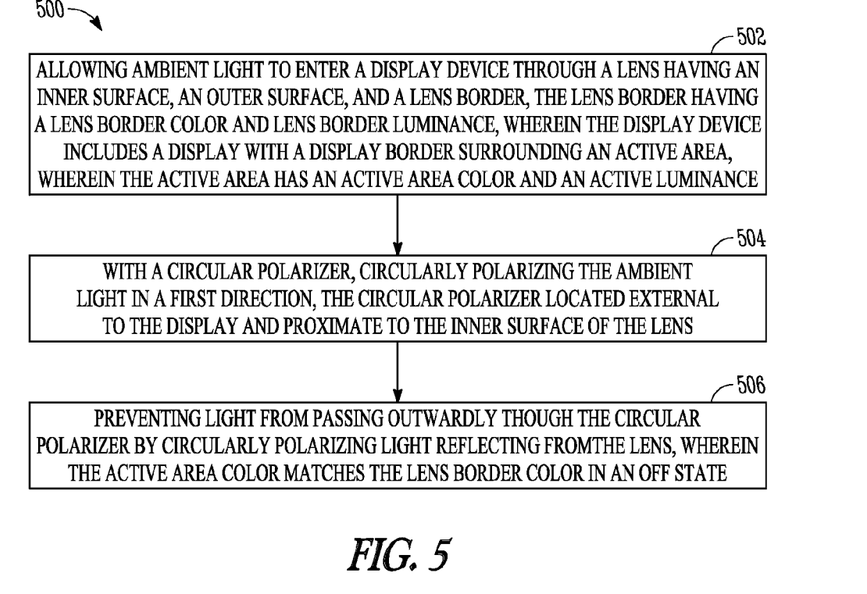
FIG. 5 is a block diagram according to an example embodiment.

FIG. 5 is a block flow diagram of a method 500 according to an example embodiment. The method 500 is an example of a method that can be performed in whole, or in part, by a device display. Such a display device can include at least one processor, at least one memory device, a network interface device, and a user interface.

The example method 500 includes, in one embodiment, allowing 502 ambient light to enter a display device through a lens having an inner surface, an outer surface, and a lens border, the lens border having a lens border color and lens border luminance, wherein the display has a display border surrounding an active area having an active area color and an active area luminance. The method continues by thereafter, with a circular polarizer, circularly polarizing 504 the ambient light in a first direction, the circular polarizer located external to the display and proximate to the inner surface of the lens. The method continues by preventing 506 light from passing outwardly through the circular polarizer by circularly polarizing light reflecting from the lens, wherein the active area color matches the lens border color in an off state. In one embodiment, the method prevents the light from passing outwardly through the circular polarizer by circularly polarizing light reflecting from one or more elements located between the display and the lens. This result occurs because the ambient light becomes circularly polarized after passing through the circular polarizer, and, upon reflecting off the one or more elements, changes direction, thus becoming unable to pass back through the circular polarizer.

The method can further include, for embodiments in which the display emits linearly polarized light (rather than circularly polarized light), circularly polarizing light leaving the display with a second quarter wave retarder located between the circular polarizer and the display.

In one embodiment, a method comprising allowing ambient light to enter a lens device, the lens device contained in a display device, wherein the lens device has a lens border defining an outer area of a lens, the lens border having a lens border color; with a circular polarizer, circularly polarizing the ambient light in a first direction, the circular polarizer located proximate to the lens border, and preventing light from passing outwardly through the circular polarizer by circularly polarizing light reflecting from the lens device, wherein the lens border color substantially matches an active area color of an active area located on the display device is provided. Embodiments described herein provide, for the first time, the ability to reduce reflection between a lens and a display, from one or more elements located between the lens and the display, or both, through use of an external circular polarizer applied to a covering lens, rather than to a display located under the lens. Various embodiments further allow, for the first time, the ability to provide a display which has the same borderless appearance across on and off states, through inclusion of a second quarter wave retarder on top of the display.

Method examples described herein can be machine or computer-implemented, at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Although specific embodiments have been illustrated and described herein, it will be appreciated by those of ordinary skill in the art that any procedure that is calculated to achieve the same purpose may be substituted for the specific embodiments shown. This application is intended to cover any adaptations or variations of the present subject matter. For example, although the various embodiments have been described in terms of one or more circular polarizers, it is also possible to use one or more elliptical polarizers. Therefore, it is manifestly intended that embodiments described herein be limited only by the claims and the equivalents thereof.

What is claimed is:

1. An apparatus comprising:
   a display device that includes a display and a quarter wave retarder, the display device having an active area located on the display;
   a lens device that includes a lens border having a lens border color that substantially matches an active area color of the active area of the display device; and
   a circular polarizer located proximate to the lens border, the circular polarizer being substantially aligned with the display and substantially covering the display, and the quarter wave retarder of the display device being located between the circular polarizer and the display.

2. The apparatus of claim 1 wherein the active area has an active area luminance and the lens border has a lens border luminance which substantially matches the active area luminance.

3. The apparatus of claim 2 wherein the lens device further comprises a lens which is substantially aligned with and located external to the display.

4. The apparatus of claim 3 wherein the lens border is located between the lens and the circular polarizer.

5. The apparatus of claim 4 wherein the circular polarizer is secured to an inner surface of the lens.

6. The apparatus of claim 4 wherein the circular polarizer is integral with the inner surface of the lens.

7. The apparatus of claim 3 wherein the lens border is located on an inner surface of the circular polarizer.

8. The apparatus of claim 3 wherein the display contains an integral linear polarizer.

9. The apparatus of claim 3 wherein the display has a display border which defines the active area.

10. The apparatus of claim 9 wherein the lens border and display border are substantially aligned and the circular polarizer is substantially aligned with and substantially covers the active area.

11. The apparatus of claim 10 wherein the lens border is a silk-screened border, an inked border or a painted border located on the lens or the circular polarizer.

12. The apparatus of claim 3 further comprising one or more elements located between the display and the lens.

13. The apparatus of claim 12 wherein at least one of the one or more elements is a touch panel.

14. The apparatus of claim 3 wherein the display is in an off state.

15. The apparatus of claim 12 wherein the circular polarizer is located between about 0.2 mm and about 1.5 mm from the outer surface of the lens.

16. The apparatus of claim 12 wherein the display is a liquid crystal display (LCD), a light emitting diode (LED), an organic LED (OLED), an active matrix OLED (AMOLED), cathode ray tube (CRT), electro luminescent display, vacuum fluorescent display or micro electro-mechanical (MEM) display.

17. The apparatus of claim 3 wherein the display device is a transmissive display device or an emissive display device.

18. The apparatus of claim 1 wherein the lens border is located between the circular polarizer and the display device.

19. The apparatus of claim 18 wherein the lens device further comprises a lens, the circular polarizer being located between the lens and the lens border.

20. The apparatus of claim 1 wherein the lens device further comprises a lens which is substantially aligned with the display and located external to the display, the circular polarizer being located between the lens and the display device.

21. The apparatus of claim 1 wherein the display contains an integral linear polarizer.

22. A method comprising:
    allowing ambient light to enter an apparatus comprising a display device having an active area and a lens device, the active area being located on a display included in the display device, wherein the lens device has a lens border with a lens border color that substantially matches an active area color of the active area of the display device;
    with a circular polarizer, circularly polarizing the ambient light in a first direction, the circular polarizer located proximate to the lens border;
    circularly polarizing light leaving the display with a quarter wave retarder located between the circular polarizer and the display; and
    preventing light from passing outwardly through the circular polarizer by circularly polarizing light reflecting from the lens device.

23. The method of claim 22 wherein the light is prevented from passing outwardly through the circular polarizer by polarizing the light in a second direction opposite to the first direction and the lens border has a lens border luminance which substantially matches the active area luminance in an off state.

24. The method of claim 23 wherein the lens device further comprises a lens which is substantially aligned with and located external to the display.

25. The method of claim 24 wherein the lens border is located on an inner surface of the circular polarizer.

26. The method of claim 24 wherein the circular polarizer is substantially aligned with and substantially covers the active area.

27. The method of claim 24 wherein the circular polarizer is substantially aligned with and substantially covers the display.

28. The method of claim 23 wherein the lens device emits linearly polarized light.

29. The method of claim 28 wherein the active area color and active area luminance substantially match the lens border color and lens border luminance to provide the lens border and active area with a substantially uniform appearance.

30. The method of claim 24 wherein one or more elements are located between the display and the lens, and light is prevented from passing outwardly through the circular polarizer by circularly polarizing light reflecting from the one or more elements.

31. The method of claim 30 wherein at least one of the one or more elements is a touch panel.

32. The method of claim 22 wherein the lens border is located between the lens and the circular polarizer.

* * * * *